United States Patent [19]

Wisor et al.

[11] Patent Number: 5,442,794
[45] Date of Patent: Aug. 15, 1995

[54] DISABLE TECHNIQUE EMPLOYED DURING LOW BATTERY CONDITIONS WITHIN A PORTABLE COMPUTER SYSTEM

[75] Inventors: Michael T. Wisor; Rita M. O'Brien, both of Austin, Tex.

[73] Assignee: Advanced Micro Devices, Inc., Sunnyvale, Calif.

[21] Appl. No.: 160,930

[22] Filed: Dec. 1, 1993

[51] Int. Cl.⁶ .............................................. G06F 17/00
[52] U.S. Cl. .................................... 395/750; 364/483; 364/550
[58] Field of Search ................. 364/550, 483; 395/750

[56] References Cited

U.S. PATENT DOCUMENTS

| | | | |
|---|---|---|---|
| 5,070,357 | 12/1991 | Kazami et al. | 354/468 |
| 5,167,024 | 11/1992 | Smith et al. | 395/750 X |
| 5,369,771 | 11/1994 | Gettel | 395/750 |
| 5,388,265 | 2/1995 | Volk | 395/750 |

Primary Examiner—Edward R. Cosimano
Attorney, Agent, or Firm—Conley, Rose & Tayon

[57] ABSTRACT

A computer system is provided that employs a disable technique which warns the user of a low battery condition when the user attempts to power-on the computer, and which prevents power from being applied to a primary portion of the computer system. A battery monitor is included for monitoring the voltage across the battery, and for asserting a control signal when the battery voltage drops below a certain threshold value. A control unit receives the control signal and accordingly prevents power from being applied to a primary computer subsystem when the computer system is turned on. Instead, when the user attempts to turn on the computer system when the low battery-capacity condition exists, the control unit causes a pulse generator to generate a signal that drives a speaker. An audible indication of the low power condition is thereby produced. In accordance, the user is alerted to the low battery condition, while further power is prevented from being depleted from the battery as a result of applying power to the primary computer subsystem.

12 Claims, 3 Drawing Sheets

DISABLE TECHNIQUE EMPLOYED DURING LOW BATTERY CONDITIONS WITHIN A PORTABLE COMPUTER SYSTEM

BACKGROUND OF THE INVENTION

1. Field of the Invention

This invention relates; to portable computer systems and more particularly to low battery detection and indicator circuitry for portable computer systems. This invention further relates to power management units for portable computer systems.

2. Description of the Relevant Art

It is frequently desirable to warn the user of a portable computer system of a condition when the battery capacity is low. Accordingly, a variety of battery monitors and so-called "fuel gauges"have been developed that provide an external indicator of a low battery-capacity condition. These external indicators include both LED indicators: and visual displays incorporated on the computer screen. The battery monitors may indicate when the battery capacity, as inferred by the voltage across the battery, decreases below a certain threshold, or may indicate the capacity of the battery over a broad range of possible values.

In portable computer systems, if the battery capacity is diminished to a critical point, damage to the battery and other system components may occur. If the computer is powered-on, the user may receive the indication of the low battery condition in real time and may accordingly power-down the system to recharge the battery. If, on the other hand, the computer is in a powered-off state or in a power-conserving suspend state (during which, for example, the CPU clock signal and the system clock signal may be stopped), the user may be unaware of a low battery condition. Thus, if the user subsequently attempts to turn on the computer system or the system attempts to restart the CPU and system clock signals, the battery will be drained even further. This can damage the battery and other system components.

SUMMARY OF THE INVENTION

The problems outlined above are in large part solved by a disable technique employed during low battery conditions within a portable computer system according to the present invention. In one embodiment, a computer system that employs the disable technique warns the user of a low battery condition that exists when the user attempts to power-on the computer, and prevents power from being applied to the primary portion of the computer system. A battery monitor is provided for monitoring the voltage across the battery, and for asserting a control signal when the battery voltage drops below a certain threshold value. A control unit receives the control signal and accordingly prevents power from being applied to a primary computer subsystem when the computer system is turned on. Instead, when the user attempts to turn on the computer system when the low battery-capacity condition exists, the control unit causes a pulse generator to generate a signal that drives a speaker. An audible indication of the low power condition is thereby produced. In accordance, the user is alerted to the low battery condition, while further power is prevented from being depleted from the battery as a result of applying power to the primary computer subsystem.

In another embodiment, a power management unit is provided having a ready state and a power-conserving suspend state. During the ready state, a CPU clock signal and a system clock signal are driven at maximum frequencies. During the suspend state, the CPU and system clock signals are either reduced in frequencies or are entirely stopped. If a low battery condition exists, the power management unit is forced to remain in the suspend state regardless of subsequent system activity. An audible indication of the low battery condition is instead produced to alert the user of the low battery condition.

Broadly speaking, the present invention contemplates a portable computer system comprising a primary computer subsystem, a battery pack, and a power switch for providing power from the battery pack to the primary computer subsystem. The computer system further includes a battery monitor unit for monitoring the capacity of the battery pack and capable of generating a control signal indicative of a low battery condition. The computer system finally includes a control unit coupled to the battery monitor unit, wherein the control unit is capable of preventing power from being provided to the primary computer subsystem through the power switch when the control signal is asserted, and wherein the control unit is capable of generating an indicator signal for activating a user indicator when the control signal is asserted and when the power switch is closed.

The invention further contemplates a power management unit for a portable computer system comprising a battery monitor for monitoring a capacity level of a battery and capable of generating a control signal indicative of a low battery condition. The power management unit also includes a system monitor for monitoring a circuit portion of the computer system and capable of asserting a suspend state signal when the circuit portion is inactive and capable of deasserting the suspend state signal when the circuit portion is active. A clock control unit is coupled to the system monitor and is capable of asserting a clock suspend signal in response to an assertion of the suspend state signal. The clock suspend signal is for controlling the frequency of a clock signal. The system monitor asserts the suspend state signal when the control signal is asserted, and is prevented from deasserting the suspend state signal when the control signal is asserted.

The invention finally contemplates a power management method for a portable computer system comprising the steps of monitoring a circuit portion of the computer system, entering a suspend state if the circuit portion is inactive, reducing the frequency of a clock signal in response to the step of entering the suspend state, monitoring the capacity of a battery, and preventing the computer system from returning to the ready state if the capacity of the battery is below a predetermined threshold value.

BRIEF DESCRIPTION OF THE DRAWINGS

Other objects and advantages of the invention will become apparent upon reading the following detailed description and upon reference to the accompanying drawings in which.

Figure 1:
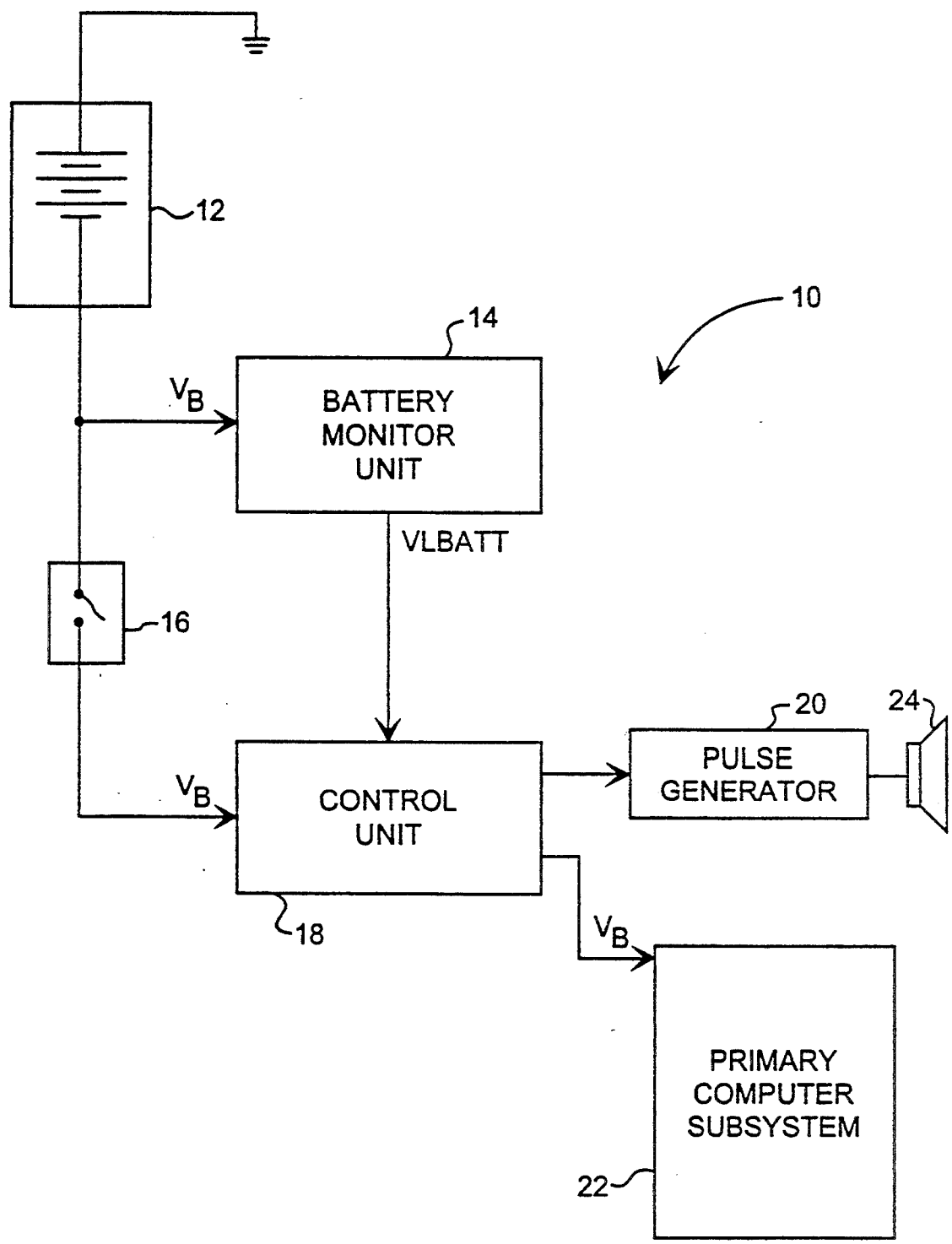
FIG. 1 is a block diagram of computer system that employs a disable technique according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a portable computer system 10 that employs a disable technique during low battery conditions according to the present invention. In the embodiment of FIG. 1, computer system 10 includes a battery pack 12 coupled to a battery monitor unit 14 and a power switch 16. A control unit 18 is coupled to battery monitor 14 and to power switch 16. Control unit 18 includes a pair of output lines, one of which is coupled to a pulse generator 20 and the other of which is coupled to a primary computer subsystem 22. A speaker 24 is finally shown coupled to pulse generator 20.

Primary computer subsystem 22 is representative of a variety of major functional subunits of computer system 10. For example, in the preferred embodiment, primary computer subsystem 22 includes a system microprocessor, a system memory, and a system display, among other things.

During normal operation of computer system 10 when the battery cells that comprise battery pack 12 are completely charged, power is provided to the primary computer subsystem 22 through power switch 16 and control unit 18. In one embodiment, the nominal voltage produced by battery pack 12 is 12 volts. When battery pack 12 is fully charged, battery monitor unit 14 detects the nominal voltage at an input line and accordingly deasserts (low) an indicator signal labeled "VLBATT". When the indicator signal VLBATT is deasserted low, control unit 18 allows battery power to be coupled to the primary computer subsystem 22 when power switch 16 is closed.

If, while power switch 16 is closed and primary computer subsystem 22 is powered-on, the voltage $V_b$ across battery pack 12 falls below a certain predetermined threshold value, battery monitor unit 14 asserts the indicator signal VLBATT. Control unit 18 responsively prevents power from being applied to primary computer subsystem 22 and generates a control signal that is received by pulse generator 20. In response to this control signal, pulse generator 20 produces a pulsed signal, as illustrated in the waveform diagram of FIG. 2. The pulsed signal generated by pulse generator 20 drives speaker 24, which accordingly produces an audible tone. It is noted that in the embodiment of FIG. 1, the pulse signal generated by pulse generator 20 induces a beeping sound consisting of three 1 second tones.

Figure 2:
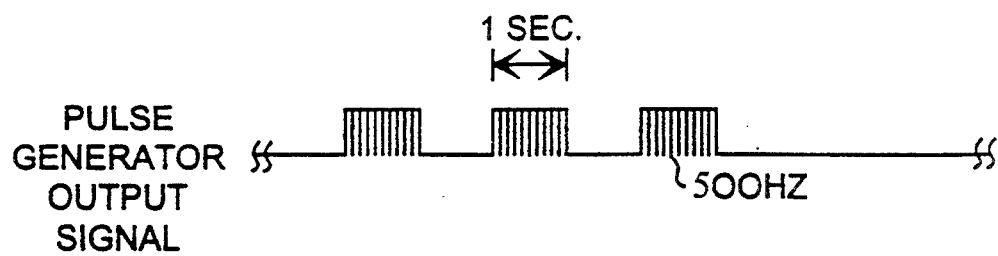
FIG. 2 is a waveform diagram that illustrates a signal provided from a pulse generator for producing an audible indication of a low battery condition.

If, on the other hand, the capacity of battery pack 12 diminishes below a certain level when the primary computer subsystem 22 is powered-down, battery monitor unit 14 again detects the low battery condition by monitoring the voltage $V_b$ across the battery pack 12. When the battery voltage $V_b$ falls below the predetermined threshold value, the battery monitor unit 14 again asserts the VLBATT signal. If the user subsequently attempts to power-on the primary computer subsystem 22 by closing power switch 16 when the VLBATT signal is asserted, control unit 18 prevents power from being applied to the primary computer subsystem 22. When the power switch 16 is closed, the control unit 18 instead provides a control signal to pulse generator 20, thereby causing the generation of the pulsed signal (as illustrated in FIG. 2) that causes sound to be produced from speaker 24.

Figure 3:
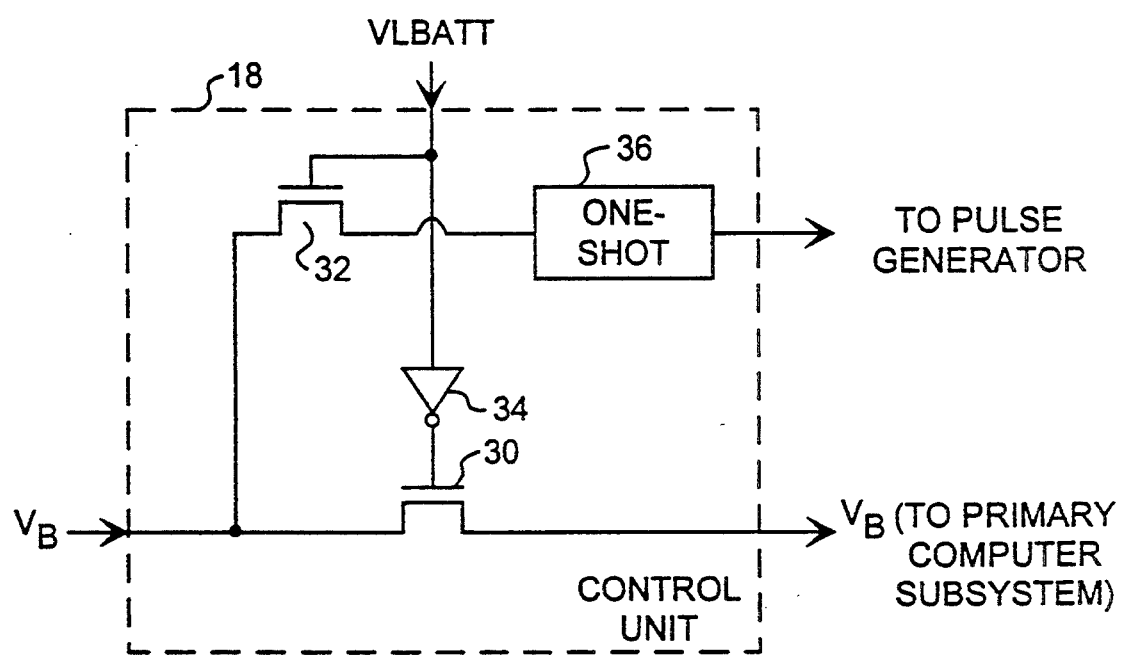
FIG. 3 is a schematic diagram of a control unit employed within the computer system of FIG. 1.

FIG. 3 illustrates one embodiment of control unit 18. The control unit 18 of FIG. 3 includes a pair of field effect transistors 30 and 32, an inverter 34, and a one-shot circuit 36. As is evident from the circuit, when the VLBATT signal is deasserted low, transistor 30 is turned on and transistor 32 is turned off. Accordingly, the battery voltage $V_b$ is provided to primary computer subsystem 22. When the VLBATT signal is asserted high, transistor 30 is turned off, and transistor 32 is turned on. Accordingly, the battery voltage is disconnected from the primary computer subsystem 22 and one-shot circuit 36 provides a signal to pulse generator 20 that causes the production of an audible indication of the low battery condition.

As a result of computer system 10, an external indication of a critically low battery condition of battery pack 12 is provided to the system user even if the primary computer subsystem 22 is powered-down. The external indicator is generated when the user attempts to power the computer system on. Since power cannot be applied to primary computer subsystem 22 when the low battery condition exists, further depletion of battery power is prevented.

Figure 4:
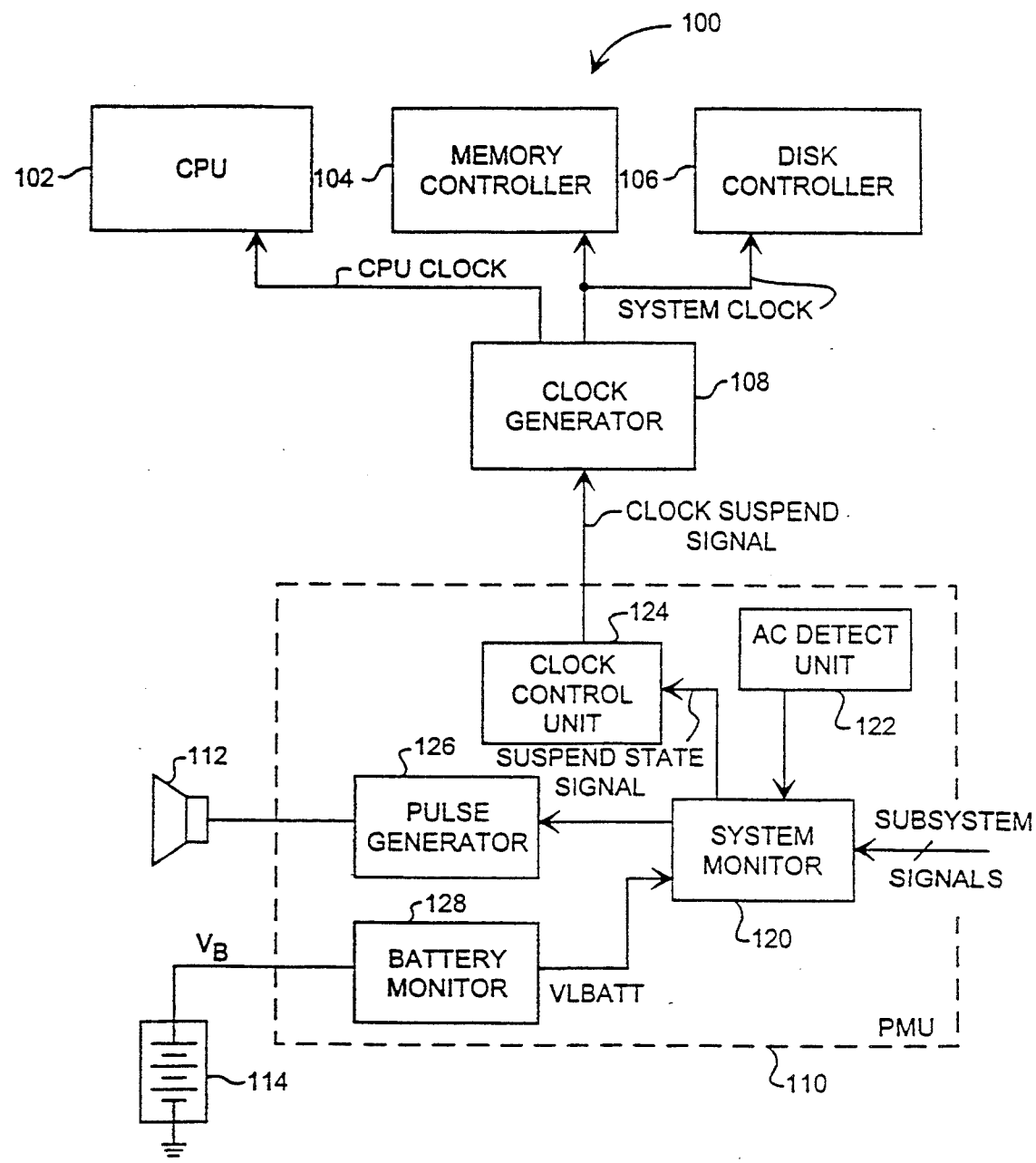
FIG. 4 is block diagram of a computer system that employs a disable technique according to another embodiment of the present invention.

Referring next to FIG. 4, a block diagram of a computer system 100 is shown that illustrates another embodiment of the present invention. The computer system 100 includes a microprocessor (CPU) 102, a memory controller 104, and a disk controller 106 coupled to a clock generator 108. The computer system 100 further includes a power management unit 110, a speaker 112, and a battery pack 114.

Clock generator 108 generates a CPU clock signal that is provided to microprocessor 102 and a system clock signal that is provided to memory controller 104 and to disk controller 106, among other things. It is noted that the CPU clock signal may have a different frequency from the system clock signal. For example, in one embodiment, the CPU clock signal has a maximum frequency of 80 MHz and the system clock signal has a maximum frequency of 40 MHz.

Power management unit 110 includes a system monitor 120 coupled to an AC detect unit 122 and to a clock control unit 124. System monitor 120 is further coupled to a pulse generator 126 and to a battery monitor 128.

Microprocessor 102, memory controller 104, and disk controller 106 are coupled to a CPU local bus (not shown). It is noted that computer system 100 may include a variety of additional peripheral devices. It is further noted that battery pack 114 provides power to microprocessor 102, memory controller 104, and disk controller 106; however, the specific connections from battery pack 114 to microprocessor 102, memory controller 104, and disk controller 106 have been omitted from the drawing in the interest of simplicity and clarity. It is also noted that AC power may be provided to computer system 100 during certain times to provide an alternate power source.

After computer system 100 has been powered on, system monitor 120 monitors various subsystems of the computer system 100 such as the microprocessor 102, memory controller 104, and disk controller 106, among other things. In one embodiment, system monitor 120 detects activity of the microprocessor and other system peripherals by detecting signal activity on the CPU local bus and/or a peripheral bus. During normal operation of computer system 100 when microprocessor 102, memory controller 104, and disk controller 106 are active, power management 110 is in a "ready"state during which the clock generator 108 drives the CPU clock signal and the system clock signal at their maximum frequencies. A variety of specific implementations of system monitor 120 could be employed within power management unit 110, and exemplary system monitors are described in numerous publications of the known prior art. For example, an exemplary system monitor that detects inactive circuit portions of a computer system is described within U.S. Pat. No. 5,167,024 issued Nov. 24, 1992 to Smith et al. This patent is incorporated herein by reference in its entirety.

When system monitor 120 determines that the microprocessor 102, the system memory controller 104, and the disk controller 106 are inactive, system monitor 120 enters a "suspend"state during which a control signal, identified herein as the "Suspend State Signal"is asserted The Suspend State Signal is provided to clock control unit 124 which accordingly asserts a control signal labelled the "Clock Suspend Signal"that is received by clock generator 108. In response, depending upon the system configuration which may be programmable by the user, the clock generator 108 either reduces the frequencies of the CPU clock signal and the system clock signal to, for example, 5 MHz and 2 MHz, respectively, or stops the CPU clock signal and the system clock signal completely (i.e., 0 MHz). Thus, when computer system 100 is in the suspend state, overall power consumption of the computer system is significantly reduced.

If the battery voltage $V_b$ across battery pack 114 falls below a certain predetermined threshold value when the computer system is in the ready state, battery monitor 128 asserts the signal VLBATT. Similar to the previously described embodiment of FIG. 1, when the system monitor 120 receives the asserted VLBATT signal, a control signal is provided to pulse generator 126 which accordingly causes an audible sound to be produced by speaker 112. At the same time, system monitor 120 is forced to enter the suspend state. Thus, the suspend state signal is asserted such that the clock control unit 124 causes clock generator 108 to either reduce the frequencies of or stop the CPU and system clock signals.

If the power management unit 110 is in the suspend state and a system activity occurs that would normally cause system monitor 120 to enter the ready state, and if the low battery signal VLBATT is asserted, system monitor 120 is prevented from entering the ready state. Depending upon the type of system activity, an audible indication alerting the user of the low battery condition is instead produced. Accordingly, the CPU clock signal and the system clock signal are kept at their low frequencies or are prevented from being restarted and, further significant power dissipation from battery pack 114 is prevented.

It is noted that in addition to controlling the frequencies of the CPU clock signal and the system clock signal, power management 110 may further be configured to control the application of power to microprocessor 102, memory controller 104, disk controller 106, among other things, in a similar manner. In such a configuration, a circuit similar to that of FIG. 1 may be employed wherein switch 16 is an electronic switch selectively controlled by system monitor 120 depending upon whether the system is in the ready or in the suspend state.

It is further noted that the disable technique employed during low battery conditions as described herein may be used in conjunction with a variety of additional power management techniques. For example, the disable technique may be employed in conjunction with the power management techniques taught within the co-pending, commonly assigned patent applications: "System Oscillator Gating Technique For Power Management Within a Computer System"by O'Brien, Ser. No. 08/160,931, filed concurrently herewith; "Interrupt Controller With In-Service Indication"by MacDonald et al , Ser. No. 08/125,336, filed Sep. 22, 1993; and "Power Management Control Technique For Timer Tick Activity Within An Interrupt Driven Computer System", by O'Brien et al., Serial No. 08/156,888, filed Nov. 23, 1993. These patent applications are incorporated herein by reference in their entirety.

Numerous variations and modifications will become apparent to those skilled in the art once the above disclosure is fully appreciated. For example, although the computer system 10 of FIG. 1 illustrates a pulse generator 20 and a speaker 24 for producing an audible indication of the low battery condition, other indicators that warn the user of the low battery condition may be employed, such as an LED display. It is intended that the following claims be interpreted to embrace all such variations and modifications.

What is claimed is:

1. A portable computer system comprising:
   a primary computer subsystem;
   a battery pack;
   a power switch coupled between said battery pack and said primary computer subsystem for providing power from said battery pack to said primary computer subsystem;
   a battery monitor unit for monitoring the capacity of said battery pack and capable of generating a control signal indicative of a low battery condition; and
   a control unit coupled to said battery monitor unit, wherein said control unit is capable of preventing power from being provided to said primary computer subsystem through said power switch when said control signal is asserted, and wherein said control unit is capable of generating an indicator signal for activating a user indicator when said control signal is asserted and said power switch is closed.

2. The portable computer system as recited in claim 1 wherein said battery pack includes a plurality of battery cells.

3. The portable computer system as recited in claim 1 wherein said control unit is coupled in series between said power switch and said primary computer subsystem.

4. The portable computer system as recited in claim 1 wherein said user indicator includes a sound generator coupled to said power control unit, wherein said sound generator produces a sound when said indicator signal is provided by said control unit.

5. The portable computer system as recited in claim 4 wherein said sound generator comprises:
   a pulse generator for generating a pulsing signal; and
   a speaker coupled to receive said pulsing signal.

6. The portable computer system as recited in claim 1 wherein said primary computer subsystem includes a microprocessor.

7. The portable computer system as recited in claim 6 wherein said primary computer subsystem further includes a system memory.

8. A power management unit for a portable computer system comprising:
   a battery monitor for monitoring a capacity level of a battery and capable of generating a control signal indicative of a low battery condition;
   a system monitor coupled to said battery monitor for monitoring a predetermined subsystem of said computer system and capable of asserting a suspend state signal when said predetermined subsystem of said computer system is inactive and capable of deasserting said suspend state signal when said predetermined subsystem of said computer system is active;
   a clock control unit coupled to said system monitor, wherein said clock control unit is capable of asserting a clock suspend signal in response to an assertion of said suspend state signal, wherein said clock suspend signal is for controlling the frequency of a clock signal; and
   wherein said system monitor asserts said suspend state signal when said control signal is asserted, and wherein said system monitor is prevented from deasserting said suspend state signal when said control signal is asserted.

9. The power management unit as recited in claim 8 further comprising an external indicator driver coupled to said system monitor, wherein said system monitor provides an indicator signal to said external indicator driver for causing an external indicator device to activate when said suspend state signal is asserted.

10. The power management unit as recited in claim 9 wherein said external indicator driver is a pulse generator.

11. A power management method for a portable computer system comprising the steps of:
   monitoring a predetermined subsystem of said computer system;
   entering a suspend state from a ready state if said predetermined subsystem of said computer system is inactive;
   reducing the frequency of a clock signal in response to said step of entering said suspend state;
   monitoring the capacity of a battery; and
   preventing said computer system from returning to said ready state if the capacity of said battery is below a predetermined threshold value.

12. The power management method for a portable computer system as recited in claim 11, wherein said predetermined subsystem of said computer system includes a microprocessor.

* * * * *